Oct. 9, 1945.   K. C. KNAPP   2,386,615
PIPE LINE RECLAIMER
Filed Feb. 21, 1945   2 Sheets-Sheet 1
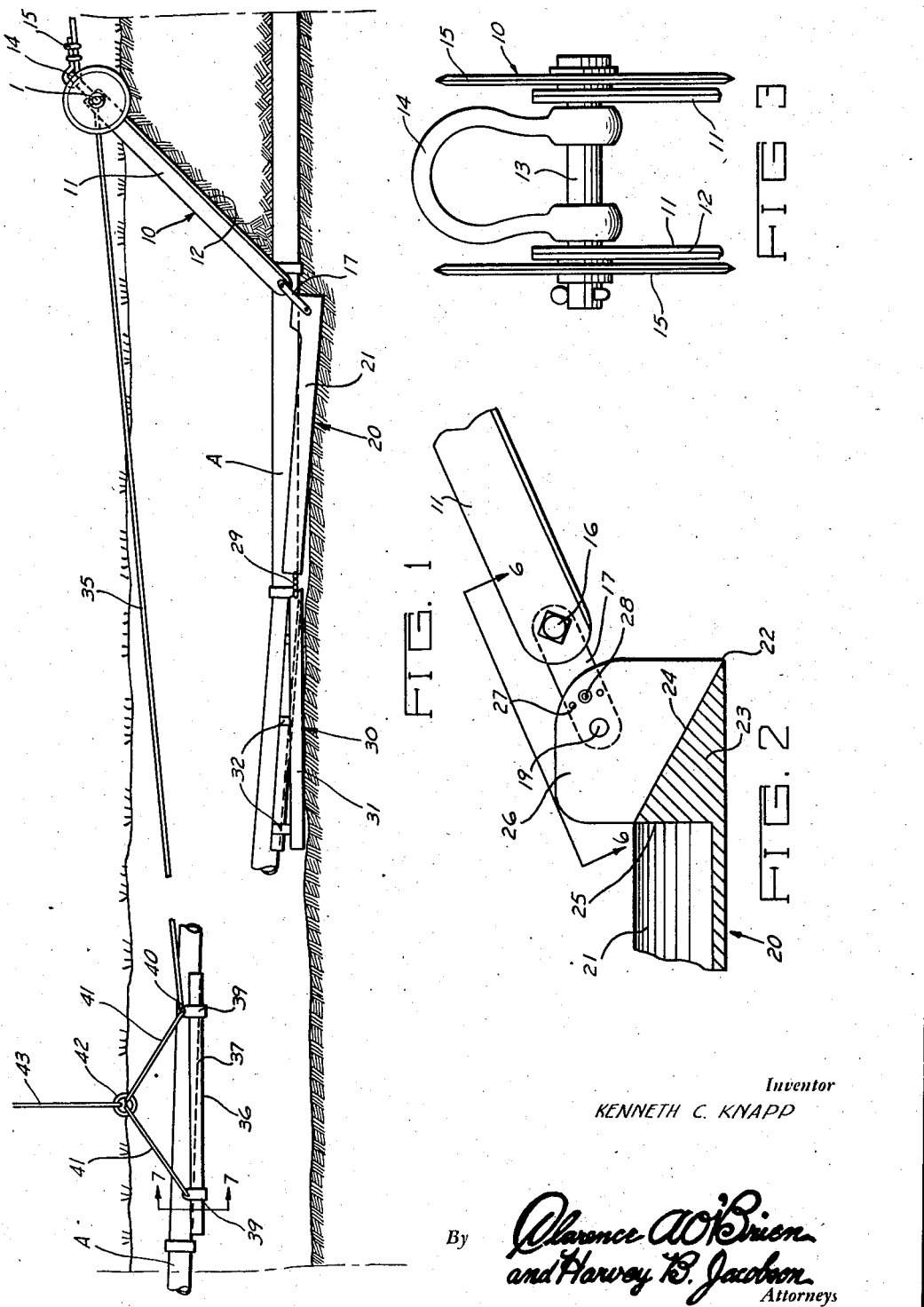
Inventor
KENNETH C. KNAPP Oct. 9, 1945.    K. C. KNAPP    2,386,615
PIPE LINE RECLAIMER
Filed Feb. 21, 1945    2 Sheets-Sheet 2

Inventor
KENNETH C. KNAPP

By *Clarence A. O'Brien and Harvey B. Jacobson*
Attorneys

Patented Oct. 9, 1945

2,386,615

UNITED STATES PATENT OFFICE 2,386,615

PIPE-LINE RECLAIMER

Kenneth C. Knapp, Oxford, Kans.

Application February 21, 1945, Serial No. 579,033

3 Claims. (Cl. 37—1)

This invention relates to improvements in pipe line reclaimers and constitutes an improvement over my prior Patent No. 2,105,602 issued January 18, 1938.

The apparatus herein described is designed for reclaiming or raising to the surface pipes buried beneath the ground.

In the ordinary procedure in recovering buried pipes it has been customary to dig a trench until the pipe is exposed, then to lift the pipe to the surface of the ground and lay it alongside of the trench after which the trench had to be filled, all of which necessitated a vast amount of labor.

The primary object of the present invention is to loosen the earth about the pipe and immediately thereafter to elevate the pipe through the loosened earth to the ground level without the necessity of forming an open trench which later must be filled.

Among its features my invention embodies a trench cutter combined with a pipe elevator by means of which the pipe is automatically loosened from its position beneath the soil and carried to the surface on top of the loosened earth.

In the drawings:

Figure 1 is a side view of my improved pipe reclaimer and elevator showing the same in use.

Figure 2 is an enlarged side view of the forward end of the pipe engaging and loosening shoe and the lower rear ends of the trench cutter blades.

Figure 3 is a front end view of the cutter blades, the operating clevis and the weed cutting wheels.

Figure 4:
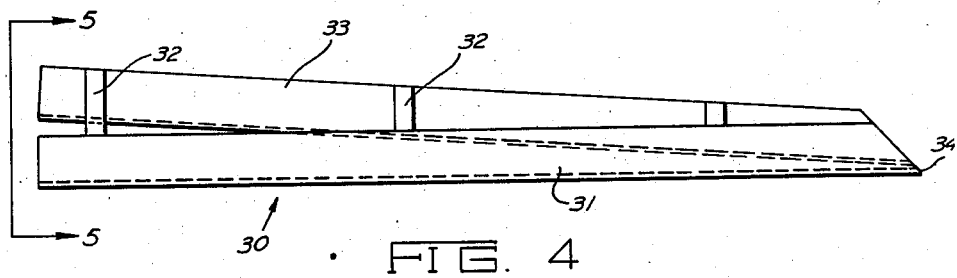
Figure 4 is a side view in elevation of the pipe elevating shoe used in conjunction with my invention.

Referring to the drawings in detail my improved trench cutter designated generally 10 comprises a pair of cutting blades 11 which are sharpened along their forward edges 12 so as to cut and loosen the earth on opposite sides of the pipe to be extracted as will be more fully explained. The upper forward ends of the blades 11 are pierced to receive a pivot pin 13 and mounted on the pin between the blades is a clevis 14 to which a towing cable or chain 15 is attached, it being understood that the opposite end of this cable is secured to a tractor or other power device for exerting pull thereon to drag the trench cutter 10 beneath the surface of the ground. Mounted on the ends of the pivot 13 on the outside of each of the blades 11 are weed cutting disks 15 which also serve to loosen the ground adjacent its surface. The ends of the blades 11 opposite those which are connected to the pivot pin 13 are pierced to receive bolts 16.

Connected to the bolts 16 are links 17 the opposite ends of which are provided with trunnions 18 which are received in openings 19 formed in the forward end of the shoe member designated generally 20. The shoe member 20 comprises an elongated semi-cylindrical body 21 forming a trough or cradle which rides beneath the pipe to be lifted as illustrated in Figure 1. Formed at the forward end of the body 20 is a sharpened edge 22 and rising upwardly from the edge 22 toward the rear of the body 21 is a block 23 having an inclined surface 24 which forms a shoulder 25 near the forward end of the body 21. This block and body cooperate to form a plough point which serves to dig beneath the pipe as illustrated in Figure 1 and forms the bottom link of the excavating member 10. Projecting upwardly from the forward end of the body 21 on opposite sides are ears 26 which are pierced at 27 with an arcuate series of openings to receive adjusting bolts 28 by means of which the angular position of the links 17 on the shoe member may be adjusted.

Figures 5, 6:
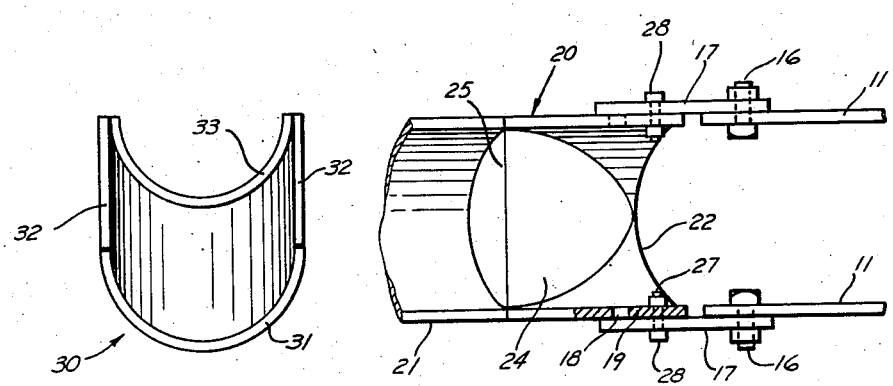
Figure 5 is a rear end view of Figure 4.
Figure 6 is a plan view taken on the line 6—6 of Figure 2.
Figures 7, 8:
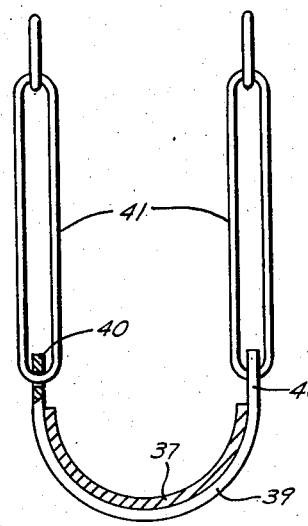
Figure 7 is an enlarged sectional view taken on the line 7—7 of Figure 1.
Figure 8 is an enlarged plan view of the forward end of the pipe elevator.

Flexibly attached to the rear end of the shoe member as by chain links 29 is a pipe elevator designated generally 30. This pipe elevator comprises a shoe 31 which is adapted to ride on the bottom of the trench produced by the shoe member 20 and supported on legs 32 which are welded to the upper edges of the body 31 as illustrated in Figure 5 is a pipe guide or cradle 33 which as shown in Figures 1 and 4 rises gradually from its forward sharpened end 34 to the rear end so that as the pipe is loosened from the earth and enters the cradle 33 it will be gently lifted by the forward motion of the apparatus.

Connected by a cable or drag line 35 the forward end of which is attached to the pin 13 and trailing some distance behind the equipment just described, is a cradle designated generally 36. This cradle comprises a transversely semi-circular body 37 of a length to sustain a pipe without seriously bending it. The forward end of the body 37 is flared outwardly as at 38

(Figure 6) and secured as by welding adjacent opposite ends of the body 37 are straps 39 terminating in ears 40 which are pierced to receive chain links 41 the opposite ends of which are brought together at a central position above the body 36 and connected through a ring 42 which is suspended by a cable 43 from the boom of a boom tractor arranged to follow the equipment previously described.

In operation, a relatively short trench is first cut in order to expose the pipe A for a short distance after which the shoe 20 is placed in position beneath the pipe. The links 17 are then attached at the desired angle by moving them about their pivots and locking them in position by means of the bolt 28 after which the blades 11 are attached to the opposite ends of the links 17 by means of the bolts 16. The pulling cable or chain 15 is then secured to the clevis 14 and to the tractor or other pulling device to be employed. The shoe 30 is next arranged beneath the pipe as illustrated in Figure 1 and attached by chain 29 to the shoe 20 so that as the shoe 20 advances the elevator will also move. Upon exerting pull on the cable 15 it will be seen that the device will drag along the underside of the pipe as illustrated in Figure 1 with the blades 11 serving as a trench cutter and the shoe 20 excavating beneath the pipe so that it can be readily lifted by the elevator 30. Thus far the device is perfectly workable and can be used admirably in extracting a pipe from the earth without injury. In order, however, to elevate the pipe through the loosened earth and deposit it on top thereof I employ the elevator 36 which as shown is connected by drag line 35 to the pivot 13 to which the clevis 14 is attached, it will thus be seen that as the trench cutter and pipe elevator move the elevating device 36 will likewise be moved in unison therewith. In order that the pipe may be lifted to a height sufficient to rest upon the loosened earth the elevator 36 is sustained on cable 43 which, in turn, is supported on the boom of a boom tractor arranged to follow the power tractor.

It will thus be seen that as the device advances the earth above the pipe is loosened and the pipe is lifted from the bottom of the trench thus formed and carried upwardly by means of the elevator 36 so that it rests upon the surface of the loosened earth ready for subsequent operations.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A pipe extractor comprising the combination with a trench cutter comprising a pipe engaging shoe, a pair of spaced parallel trench cutting bars secured to the forward end of said shoe and extending upwardly and forwardly therefrom, a clevis at the upper ends of said bars for attachment to a traction device and weed cutters adjacent the upper ends of the trench cutting bars, of an elevator comprising a pipe loosening and raising device attached to the rear end of the trench cutter for starting the elevation of a buried pipe and an elevator adapted to travel near the surface of the ground in unison with the trench cutter for elevating the pipe and depositing it on the surface of the loosened earth lying in the trench.

2. A pipe line reclaimer comprising the combination with an elongated semi-cylindrical pipe engaging shoe solid at one end and open at its respective opposite end, said shoe at the solid end having a beveled surface, and also provided at said end with upstanding ears projecting from opposite sides of the upper surface of the side walls thereof, a pair of links pivoted in the ears, means to retain the links in various angular positions with relation to the shoe, trench cutter blades pivoted to the links and extending upwardly and forwardly from the shoe, a clevis pivoted to the upper ends of the trench cutting blades, of a pipe elevating device flexibly connected to the rear end of the shoe.

3. A pipe line reclaimer comprising the combination with an elongated semi-cylindrical pipe engaging shoe solid at one end and open at its respective opposite end, said shoe at the solid end having a beveled surface, and also provided at said end with upstanding ears projecting from opposite sides of the upper surface of the side walls thereof, a pair of links pivoted in the ears, means to retain the links in various angular positions with relation to the shoe, trench cutter blades pivoted to the links and extending upwardly and forwardly from the shoe, a clevis pivoted to the upper ends of the trench cutting blades, of a pipe elevating device flexibly connected to the rear end of the shoe, a pipe elevating cradle having suspension means for holding it at the surface of the ground, and a tow line connecting the cradle with the upper forward ends of the trench cutting blades.

KENNETH C. KNAPP.